US007167812B1

(12) United States Patent
Urmanov et al.

(10) Patent No.: US 7,167,812 B1
(45) Date of Patent: Jan. 23, 2007

(54) METHOD AND APPARATUS FOR HIGH-SENSITIVITY DETECTION OF ANOMALOUS SIGNALS IN SYSTEMS WITH LOW-RESOLUTION SENSORS

(75) Inventors: Aleksey M. Urmanov, San Diego, CA (US); Kalyanaraman Vaidyanathan, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 304 days.

(21) Appl. No.: 10/903,160

(22) Filed: Jul. 29, 2004

(51) Int. Cl.
  *H04N 1/60* (2006.01)
(52) U.S. Cl. ...................................................... 702/183
(58) Field of Classification Search ................ 702/183, 702/58, 63; 324/500; 700/292; 714/1
  See application file for complete search history.

(56) References Cited

U.S. PATENT DOCUMENTS 4,937,763 A   6/1990   Mott .......................... 364/550

6,019,496 A * 2/2000 Rao et al. .................... 711/131

OTHER PUBLICATIONS

Rajesh Rajamani, Faulty Diagnostics for Intelligent Vehicle Application, May 2001, pp. 1-81.*
Merriam-Webster's dictionary Tenth edition, 1993, p. 718.*

* cited by examiner

*Primary Examiner*—John Barlow
*Assistant Examiner*—Tung S. Lau
(74) *Attorney, Agent, or Firm*—Park, Vaughan & Fleming, LLP; Edward J. Grundler

(57) ABSTRACT

A system that facilitates high-sensitivity detection of anomalous signals in systems with low-resolution sensors. During system operation, a low-resolution sensor monitors a signal within the system. The system periodically polls the low-resolution sensor in a burst mode to obtain a plurality of measurements of the signal within a specified short time interval, wherein the measurements are spread across multiple quantizing bins. The system then determines a mean value for the plurality of measurements. The system repeats the steps of polling the low-resolution sensor and determining the mean value to create a time-series of mean values. This time-series of mean values is subsequently analyzed to determine whether the signal is anomalous.

21 Claims, 4 Drawing Sheets

METHOD AND APPARATUS FOR HIGH-SENSITIVITY DETECTION OF ANOMALOUS SIGNALS IN SYSTEMS WITH LOW-RESOLUTION SENSORS

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF JOINT RESEARCH MATERIAL SUBMITTED ON A COMPACT DISK

Not Applicable

BACKGROUND OF THE INVENTION

1. Field of the Invention

The present invention relates to techniques for monitoring computer systems. More specifically, the present invention relates to a method and an apparatus for high-sensitivity detection of anomalous signals in systems with low-resolution sensors.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems it is necessary to be able to capture unambiguous diagnostic information that can quickly pinpoint the source of defects in hardware or software. Some high-end servers, which cost over a million dollars each, contain hundreds (or even thousands) of physical sensors that measure temperatures, voltages and currents throughout the system.

During the design process for high-end enterprise computer servers, a decision has been made about whether to use inexpensive 8-bit sample-and-hold analog-to-digital converters for physical sensors in the system instead of, for example, more-expensive 16-bit analog-do-digital converters. During system operation, a diagnostic software module polls these sensors on a regular basis, say once a minute, and compares the values against specified warning and critical thresholds. When a value exceeds a critical threshold, the diagnostic software powers off the component or shuts down the entire system to protect expensive assets.

The analog-to-digital conversion process can cause a loss of precision due to the use of a limited number of discrete values used to represent the original continuous signal. For example, with an 8-bit digital representation, a continuous signal is represented by only $2^8=256$ digital values. In many cases, if one is interested only in protection of assets, such a representation is adequate. However, when sophisticated statistical methods are to be employed for advanced monitoring of the high-end servers, this coarse quantization of the digitized signals can severely limit the applicability of many surveillance techniques that rely on precise measurement to detect anomalous signals before they reach a critical threshold.

FIG. 1 illustrates quantized and measured values versus time for an exemplary voltage signal within the system. (Note that the signal being monitored could also be a temperature, a current, or some other physical parameter in the system.) The voltage signal is quantized into several 0.01 volt bins as shown on the left-hand portion of FIG. 1. Each of these bins corresponds to one of the possible digital values in a quantized digital representation of the signal. However, these quantized values do not readily indicate the rising trend of the monitored signal, which is clearly evident that appear on the measured values in the right-hand portion of FIG. 1.

Some systems attempt to mitigate the problems caused by this quantization by averaging or integrating the samples received from the analog-to-digital converters. The most common use of averaging/integration is to filter power line noise by integrating over one or several power line cycles. Statistically, averaging over a period of time reduces the variance of the noise component by a factor of $\sqrt{N}$ where N is the number of individual values over which the average is computed. Yet another useful effect of averaging is that the resulting signal has more distinct values than the original coarsely quantized signal.

It is possible to average measurements from the original quantized signal, but that drastically reduces the number of available measurements and lengthens the time to decision by subsequent statistical procedures. On the other hand, averaging with a sliding window would preserve the number of measurements. However, a sliding window can introduce unwanted serial correlation in the resulting signals, making the subsequent analysis more complicated.

Imposing a threshold limits on stationary current and voltage signals is the present practice throughout the computing industry. However, if there is noise in the process, and if the thresholds are set too closely, one can obtain false alarms from spurious noise values that have no performance significance. False alarms can result in extremely costly shutdowns of system boards or entire servers. As a result, threshold limits are frequently set at fairly wide levels (±5% of the nominal mean is typical). Research has shown that many failures appear as signal anomalies that are well within the typical threshold limits.

Hence, in order to detect these anomalies, what is needed is a method and an apparatus for overcoming the "quantization effects" of the inexpensive 8-bit analog-to-digital converters described above.

BRIEF SUMMARY OF THE INVENTION

One embodiment of the present invention provides a system that facilitates high-sensitivity detection of anomalous signals in systems with low-resolution sensors. During system operation, a low-resolution sensor monitors a signal within the system. The system periodically polls the low-resolution sensor in a burst mode to obtain a plurality of measurements of the signal within a specified short time interval, wherein the measurements are spread across multiple quantizing bins. The system then determines a mean value for the plurality of measurements. The system repeats the steps of polling the low-resolution sensor and determining the mean value to create a time-series of mean values. This time-series of mean values is subsequently analyzed to determine whether the signal is anomalous.

In a variation of this embodiment, determining the mean value involves computing a simple average of the plurality of measurements.

In a further variation, determining whether the signal is anomalous involves identifying a trend by calculating a slope for the time-series of mean values.

In a further variation, calculating the slope for the time-series of mean values involves using Sen's slope technique.

In a further variation, slope values departing from zero indicate an anomaly within the system.

In a further variation, monitoring the signal with the low-resolution sensor involves monitoring the signal at a site where a noise level accompanying the signal is maximized so as to ensure that measurements are spread out across multiple quantizing bins.

In a further variation, repeating the steps of polling the low-resolution sensor and determining the mean value involves waiting a specified time interval prior to performing each repetition.

In a further variation, the plurality of measurements includes at least one-hundred measurements.

DETAILED DESCRIPTION OF THE INVENTION

Figure 1:
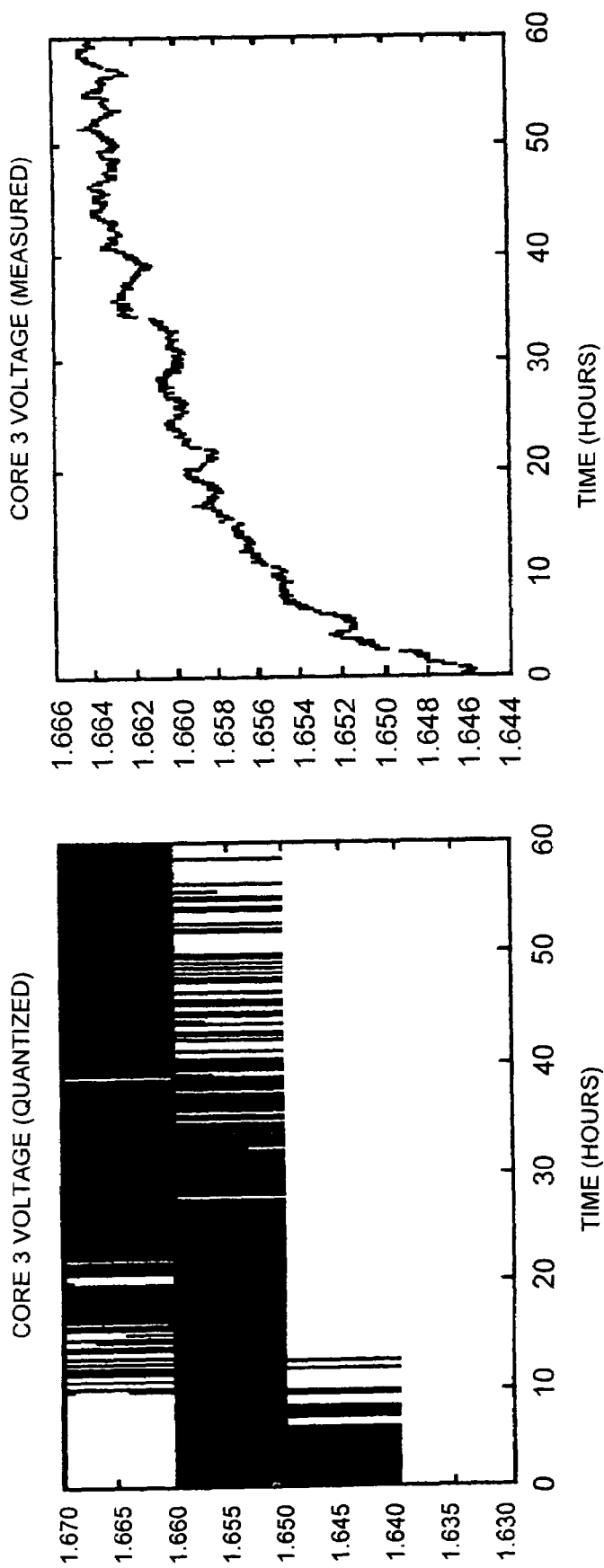
FIG. 1 illustrates quantized and measured signal values versus time.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Overview

The present invention exploits the fact that in some systems, the hardware access software allows a direct access to the analog-to-digital converters on different components. This provides us with the opportunity to manipulate the raw output of the 8-bit analog-to-digital converters to represent the signals in a more suitable form for statistical processing. Specifically, it becomes possible to perform simple averaging of a sequence of quantized values collected over a short period of time (a "burst") to significantly improve the signal-to-noise ratio. Such a simple averaging mimics the action of an integrating analog-to-digital converter, which outputs the integrated value of the input signal over an integration interval.

Given a stream of raw output observations from an 8-bit sample-and-hold analog-to-digital converter, the following burst sampling procedure improves the signal representation and improves the subsequent statistical processing. At each sampling time, the system collects N consecutive measurements, termed a "burst," averages them, and then outputs this average value. This "burst sampling" technique is integrated with a formal technique for estimating the slope of the time series of averaged samples. The objective is to automate the detection of a departure from stationarity for the time series. For many applications in high-end servers, it has been discovered that signals that are nominally supposed to be stationary or "flat" with time will show some departure from stationarity at the very incipience or onset of hardware problems. This is true, for example, with power supply output currents and with many other voltage signals throughout the servers.

An important objective for the present invention is to detect and quantify trends (calculation of slope) in the monitored variables over time. These trends can signify onset of symptoms of potential problems, thereby allowing corrective action to be taken well before these problems lead to more catastrophic consequences. Calculation of the slope involves the use of Sen's non-parametric slope-estimation technique. Sen's slope estimation technique is well known in the statistical arts and will not be described further herein.

Sen's technique for slope estimation requires a time series of data (not necessarily evenly spaced). For the simple case of one data measurement per time spacing, the procedure is as follows. Compute N' slope estimates given by $Q=(X_b-X_a)/(b-a)$ where, $X_a$ is the data point at time a, $X_b$ is the data point at time b and b>a. N' is the number of data points such that b>a. The median of these N' values of slope, Q, is the Sen's estimator of slope.

Sen's technique also allows determination of whether the median slope is statistically different from zero. A confidence interval is developed by estimating the rank of the upper and lower confidence interval and using the slopes corresponding to these ranks to define the actual confidence interval for Q'.

Burst Sampling

Figure 2:
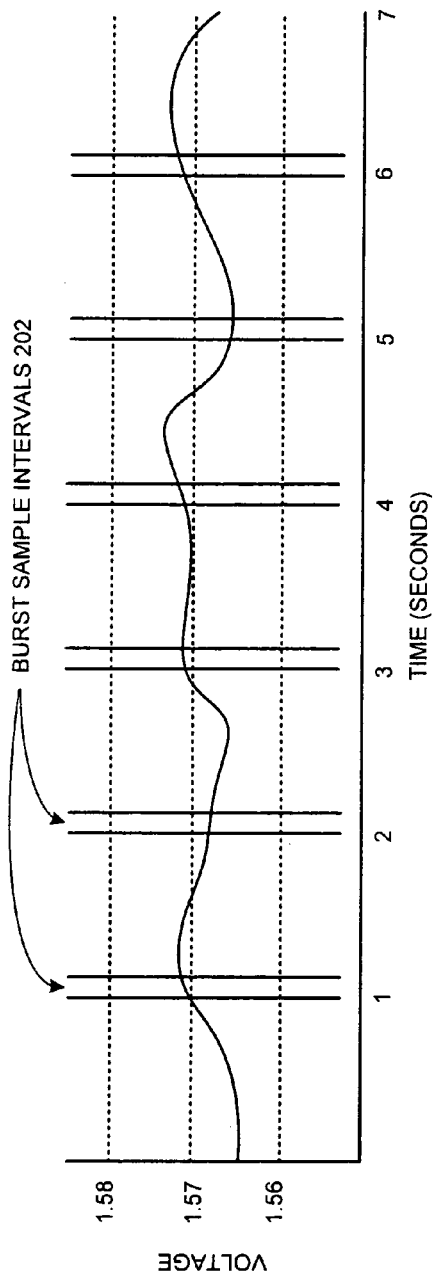
FIG. 2 illustrates burst sampling of a signal in accordance with an embodiment of the present invention.

FIG. 2 illustrates burst sampling of a signal in accordance with an embodiment of the present invention. The signal being sampled is a voltage that varies between 1.56 and 1.58 volts. Note that the signal could also be a current, a temperature, or other parameter. The voltage signal is burst-sampled approximately once per second during burst sample intervals 202. During each burst sample interval, the system samples the voltage signal numerous times. In one implementation of the present invention, the signal is sampled 100 times during each burst sample intervals 202. Note that the duration of burst sample intervals 202 may not be drawn to scale and may require less time than shown.

Signal Monitoring

Figure 3:
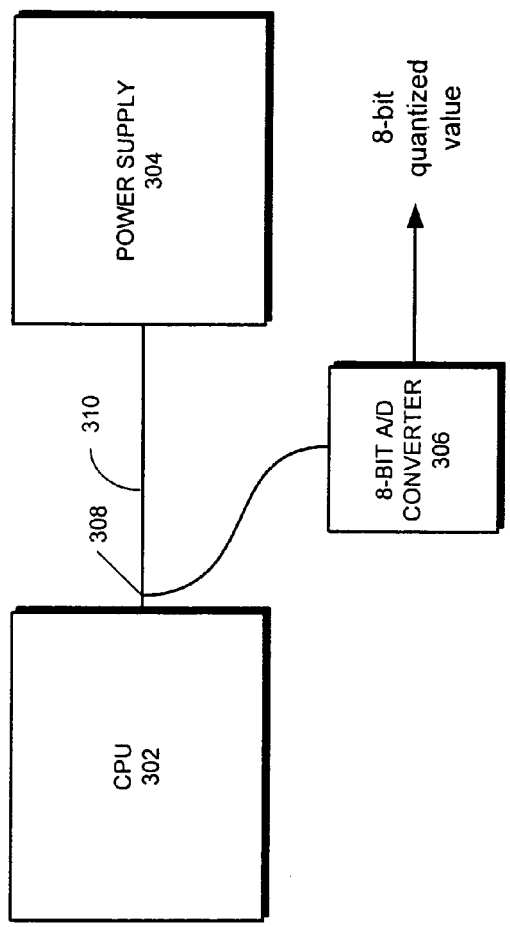
FIG. 3 illustrates monitoring of a signal with an 8-bit A/D converter in accordance with an embodiment of the present invention.

FIG. 3 illustrates how a signal is monitored with an 8-bit A/D converter in accordance with an embodiment of the present invention. Power supply 304 provides voltage 310 to CPU 302. 8-bit analog-to-digital converter 306 is coupled to voltage 310 so that it can sample voltage 310. Note that connection point 308 is determined empirically at the point where the noise accompanying voltage 308 is at a maximum, so as to ensure that the measurements are spread out across multiple quantizing bins.

Derived Signals

Figure 4:
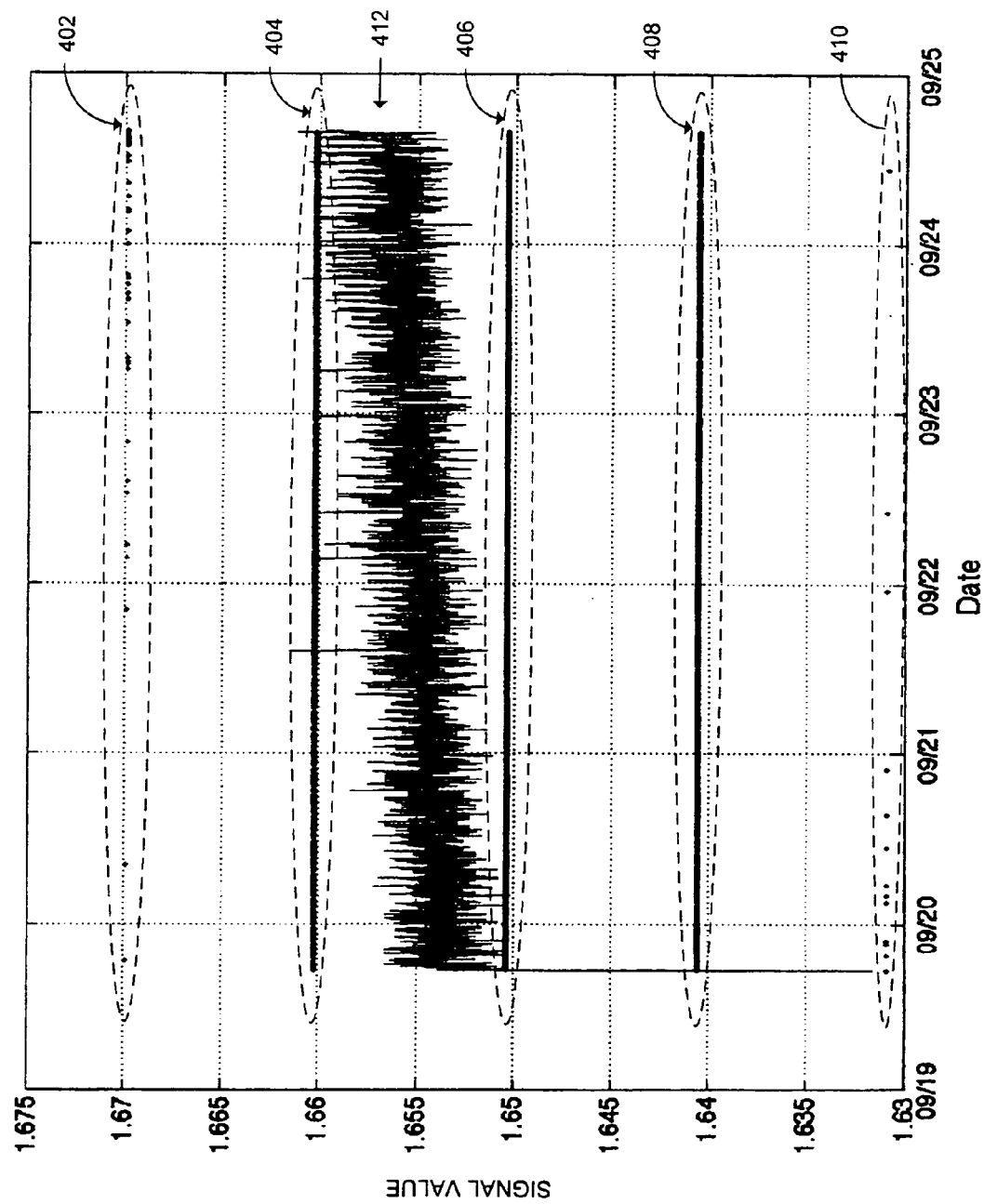
FIG. 4 illustrates a signal derived from burst samples in accordance with an embodiment of the present invention.

FIG. 4 illustrates a signal derived from burst samples in accordance with an embodiment of the present invention. in FIG. 4, a signal value is plotted versus time, which is expressed as dates. The 8-bit analog-to-digital converter samples are quantized into 5 discrete bins, bins 402, 404, 406, 408, and 410. Note that very little, if any, trend information can be gleaned from the quantized signals. In contrast, the time series of the averages for each burst sample is shown at 412. When Sen's slope technique is applied to time series 412, it is readily apparent that the signal value is drifting upward (has a positive slope) with time. This upward slope can indicate an incipient problem.

Sampling a Signal

Figure 5:
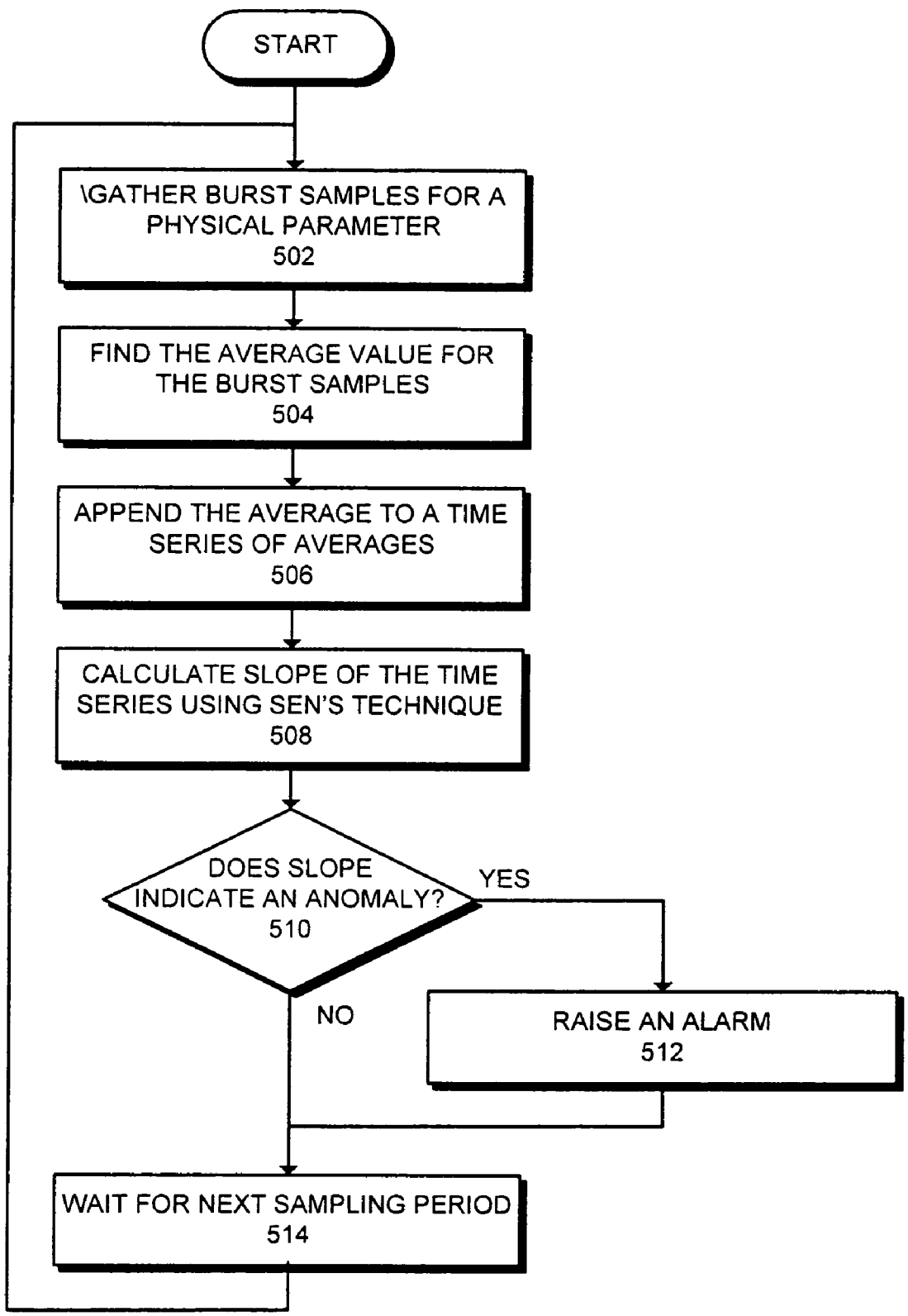
FIG. 5 presents a flowchart illustrating the process of sampling a signal in accordance with an embodiment of the present invention.

FIG. 5 presents a flowchart illustrating the process of sampling a signal in accordance with an embodiment of the present invention. The system starts by taking a burst sample of the monitored physical parameter (step 502). Next, the system determines the average value for the samples within the burst (step 504). This average is then appended to a time-series of burst sample averages (step 506).

Next, the system calculates the slope of the time series using Sen's technique (step 508). The system then determines if the slope indicates an anomaly in the monitored physical parameter (step 510). If so, the system raises an alarm (step 512). If the slope does not indicate an anomaly at step 510 (or possibly after raising an alarm at step 512), the system waits for the next sampling period (step 514) and then returns to step 502 to gather a new burst sample.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for high-sensitivity detection of anomalous signals using low-resolution sensors, comprising:
   using a low-resolution sensor to monitor a signal within a system;
   polling the low-resolution sensor in a burst mode to obtain a plurality of measurements of the signal within a specified short time interval, wherein the measurements are spread across multiple quantizing bins;
   determining a mean value for the plurality of measurements, wherein determining the mean value involves computing a simple average of the plurality of measurements;
   repeating the steps of polling the low-resolution sensor and determining the mean value to create a time-series of mean values; and
   analyzing the time-series of mean values to determine whether the signal is anomalous, wherein an anomalous signal indicates an incipient hardware failure.

2. The method of claim 1, wherein determining whether the signal is anomalous involves identifying a trend by calculating a slope for the time-series of mean values.

3. The method of claim 2, wherein calculating the slope for the time-series of mean values involves using Sen's slope technique.

4. The method of claim 2, wherein slope values departing from zero indicate an anomaly within the system.

5. The method of claim 1, wherein monitoring the signal with the low-resolution sensor involves monitoring the signal at a site where a noise level accompanying the signal is maximized so as to ensure that measurements are spread out across multiple quantizing bins.

6. The method of claim 1, wherein repeating the steps of polling the low-resolution sensor and determining the mean value involves waiting a specified interval prior to performing each repetition.

7. The method of claim 1, wherein the plurality of measurements includes at least one-hundred measurements.

8. A computer-readable storage medium storing instructions that when executed by a computer cause the computer to perform a method for high-sensitivity detection of anomalous signals using low-resolution sensors, the method comprising:
   using a low-resolution sensor to monitor a signal within a system;
   polling the low-resolution sensor in a burst mode to obtain a plurality of measurements of the signal within a specified short time interval, wherein the measurements are spread across multiple quantizing bins;
   determining a mean value for the plurality of measurements, wherein determining the mean value involves computing a simple average of the plurality of measurements;
   repeating the steps of polling the low-resolution sensor and determining the mean value to create a time-series of mean values; and
   analyzing the time-series of mean values to determine whether the signal is anomalous, wherein an anomalous signal indicates an incipient hardware failure.

9. The computer-readable storage medium of claim 8, wherein determining whether the signal is anomalous involves identifying a trend by calculating a slope for the time-series of mean values.

10. The computer-readable storage medium of claim 9, wherein calculating the slope for the time-series of mean values involves using Sen's slope technique.

11. The computer-readable storage medium of claim 9, wherein slope values departing from zero indicate an anomaly within the system.

12. The computer-readable storage medium of claim 8, wherein monitoring the signal with the low-resolution sensor involves monitoring the signal at a site where a noise level accompanying the signal is maximized so as to ensure that measurements are spread out across multiple quantizing bins.

13. The computer-readable storage medium of claim 8, wherein repeating the steps of polling the low-resolution sensor and determining the mean value involves waiting a specified interval prior to performing each repetition.

14. The computer-readable storage medium of claim 8, wherein the plurality of measurements includes at least one-hundred measurements.

15. An apparatus for high-sensitivity detection of anomalous signals using low-resolution sensors, comprising:
- a low-resolution sensor configured to monitor a signal within a system;
- a polling mechanism configured to polling the low-resolution sensor in a burst mode to obtain a plurality of measurements of the signal within a specified short time interval, wherein the measurements are spread across multiple quantizing bins;
- a mean determining mechanism configured to determine a mean value for the plurality of measurements, wherein determining the mean value involves computing a simple average of the plurality of measurements;
- a repeating mechanism configured to repeat the steps of polling the low-resolution sensor and determining the mean value to create a time-series of mean values; and
- and an analyzing mechanism configured to analyze the time-series of mean values to determine whether the signal is anomalous.

16. The apparatus of claim 15, wherein determining whether the signal is anomalous involves identifying a trend by calculating a slope for the time-series of mean values.

17. The apparatus of claim 16, wherein calculating the slope for the time-series of mean values involves using Sen's slope technique.

18. The apparatus of claim 16, wherein slope values departing from zero indicate an anomaly within the system.

19. The apparatus of claim 15, wherein monitoring the signal with the low-resolution sensor involves monitoring the signal at a site where a noise level accompanying the signal is maximized so as to ensure that measurements are spread out across multiple quantizing bins.

20. The apparatus of claim 15, wherein repeating the steps of polling the low-resolution sensor and determining the mean value involves waiting a specified interval prior to performing each repetition.

21. The apparatus of claim 15, wherein the plurality of measurements includes at least one-hundred measurements.

* * * * *